(12) United States Patent
Choi et al.

(10) Patent No.: US 11,275,866 B2
(45) Date of Patent: Mar. 15, 2022

(54) IMAGE PROCESSING METHOD AND IMAGE PROCESSING SYSTEM FOR DEEP LEARNING

(71) Applicant: Pusan National University Industry-University Cooperation Foundation, Busan (KR)

(72) Inventors: Yoon Ho Choi, Busan (KR); Dong-Hyun Ko, Busan (KR); Seok-Hwan Choi, Busan (KR); Jinmyeong Shin, Busan (KR); Seon-Jin Hwang, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 335 days.

(21) Appl. No.: 16/704,097

(22) Filed: Dec. 5, 2019

(65) Prior Publication Data

US 2021/0019443 A1 Jan. 21, 2021

(30) Foreign Application Priority Data

Jul. 17, 2019 (KR) ........................ 10-2019-0086463

(51) Int. Cl.
*G06F 21/62* (2013.01)
*G06K 9/62* (2022.01)
(Continued)

(52) U.S. Cl.
CPC ....... *G06F 21/6245* (2013.01); *G06K 9/6256* (2013.01); *G06N 3/08* (2013.01); *H04L 9/0662* (2013.01); *H04L 9/088* (2013.01)

(58) Field of Classification Search
CPC ............ G06F 21/6245; G06F 21/6209; G06K 9/6256; G06K 9/00791; G06K 9/4628;
(Continued)

(56) References Cited

U.S. PATENT DOCUMENTS 7,860,266 B2 * 12/2010 Sekiguchi .......... H04N 1/00331
382/100
8,938,067 B2 * 1/2015 Martin .................. H04L 9/0618
380/28
(Continued)

FOREIGN PATENT DOCUMENTS

CN 107480163 A * 12/2017
CN 109165523 A * 1/2019
(Continued)

OTHER PUBLICATIONS

Yi Ding, DeepEDN: A Deep-Learning-Based Image Encryption and Decryption Network for Internet of Medical Things, 2020,IEEE Internet of Things Journal, vol. 8, No. 3, Feb. 1, 2021, 15 pages (Year: 2020).*

*Primary Examiner* — Shahriar Zarrineh
(74) *Attorney, Agent, or Firm* — Cantor Colburn LLP (57) ABSTRACT

Disclosed herein is an image processing method and an image processing system for deep learning. The image processing method includes converting image data including at least one figure image into a vector image by changing a data format, encrypting at least one first attribute value for a position of the figure image in the vector image according to a selected encryption scheme, constructing a de-identified image for the image data by using a second attribute value which is changed by the encryption, and transferring the de-identified image to a cloud server in which a deep learning model is managed and processing deep learning operations of the de-identified image by the cloud server.

15 Claims, 9 Drawing Sheets

(51) Int. Cl.
H04L 9/08 (2006.01)
H04L 9/06 (2006.01)
G06N 3/08 (2006.01)

(58) Field of Classification Search
CPC ...... G06K 9/6274; G06N 3/08; H04L 9/0662; H04L 9/088; H04L 9/0894; H04L 9/0861
See application file for complete search history.

(56) References Cited

U.S. PATENT DOCUMENTS

| | | | |
|---|---|---|---|
| 10,535,120 B2 * | 1/2020 | Edwards | G06N 3/08 |
| 10,614,118 B2 * | 4/2020 | He | G06N 3/0445 |
| 10,891,985 B1 * | 1/2021 | Farre Guiu | G11B 27/19 |
| 2008/0282096 A1 * | 11/2008 | Agrawal | G06F 21/6245 713/193 |
| 2017/0192411 A1 | 7/2017 | Ghadar et al. | |
| 2019/0087689 A1 * | 3/2019 | Chen | G06N 3/08 |
| 2019/0354810 A1 * | 11/2019 | Samel | G06K 9/6219 |
| 2019/0392305 A1 * | 12/2019 | Gu | G06N 3/063 |
| 2020/0005098 A1 * | 1/2020 | Sung | G06K 9/66 |
| 2021/0150151 A1 * | 5/2021 | Xu | G06F 40/56 |
| 2021/0224586 A1 * | 7/2021 | Wang | G06K 9/6232 |

FOREIGN PATENT DOCUMENTS

| | | | | | |
|---|---|---|---|---|---|
| CN | 110288665 | A | * | 9/2019 | |
| CN | 111818346 | A | * | 10/2020 | ............ G06T 9/002 |
| JP | 2019009686 | A | * | 1/2019 | ........... G06K 9/6268 |
| KR | 101822829 | B1 | | 1/2018 | |
| KR | 20180100976 | A | * | 9/2018 | |
| KR | 1020180126220 | A | | 11/2018 | |
| KR | 20200084427 | A | * | 7/2020 | |
| WO | WO-2015195882 | A1 | * | 12/2015 | ........... H04L 9/0656 |
| WO | WO-2019088313 | A1 | * | 5/2019 | ............. G06F 21/60 |
| WO | WO-2019183584 | A1 | * | 9/2019 | ........... G06T 7/0012 |
| WO | WO-2020159497 | A1 | * | 8/2020 | ........... H04L 9/0894 |

* cited by examiner

IMAGE PROCESSING METHOD AND IMAGE PROCESSING SYSTEM FOR DEEP LEARNING

CROSS-REFERENCE TO RELATED APPLICATION(S)

This application claims the benefit of Korean Patent Application No. 10-2019-0086463, filed on Jul. 17, 2019, in the Korean Intellectual Property Office, the disclosure of which is incorporated herein by reference.

BACKGROUND

1. Field of the Invention

One or more example embodiments relate to image de-identification processing techniques for deep learning, and more particularly, to image de-identification through conversion into vector images and privacy-preserving deep learning schemes using image de-identification.

2. Description of the Related Art

The background technology of the present disclosure is disclosed in the following documents.

Korea Publication Number: 10-2018-0126220 (2018.11.27), "Method and Device for Identifying Objects"

Korea Registration Number: 10-1822829 (2018.01.23), "Detection Type Diagnosis and Noise Determination of Breaker Using Machine Learning"

U.S. Publication Number: 2017/0192411 (2017.07.06), "FEATURE SELECTION AND AUTOMATED PROCESS WINDOW MONITORING THROUGH OUTLIER DETECTION"

Deep learning is one of the machine learning technologies that constructs artificial neural networks similar to neural networks, which are sets of human neurons, and trains artificial neural networks through computers to predict the answers to problems in real life. Deep learning is being applied to various service areas, such as translation service through string data learning, computer vision through image data learning, and autonomous vehicle driving services.

Strong computing power is required to process deep learning operations used in such various services and recently, the computing power is secured by interworking with an external cloud server.

However, the cloud server is an untrusted entity because the cloud server is owned by an external and therefore, there is a risk that data transferred to the cloud server for processing of deep learning operations is stolen.

In addition, privacy preservation of original data may be difficult, and thus, securing of reliability may be limited in service fields that require data sharing, such as healthcare and finance.

Accordingly, research has been conducted on privacy-preserving deep learning (PPDL) to protect the privacy of data in a deep learning environment by cloud servers, and learning or the like using Full-Homomorphic Encryption (FHE) and Order-Preserving Encryption (OPE), Differential Privacy (DP), and Trusted Execution Environments (TEE) has been studied.

Among these, the OPE scheme is an algorithm that performs encryption by changing only the distribution of data, and enables deep learning of data encrypted by the OPE scheme even in an untrusted cloud server.

However, the OPE scheme is applicable only to data that can be ordered like numerical data, and has a weaker encryption strength than block ciphers such as DES and AES. When at least some of encrypted data of original data is known, the OPE scheme is vulnerable to a Chosen Plaintext Attack capable of inferring specific encrypted data.

Figure 1:
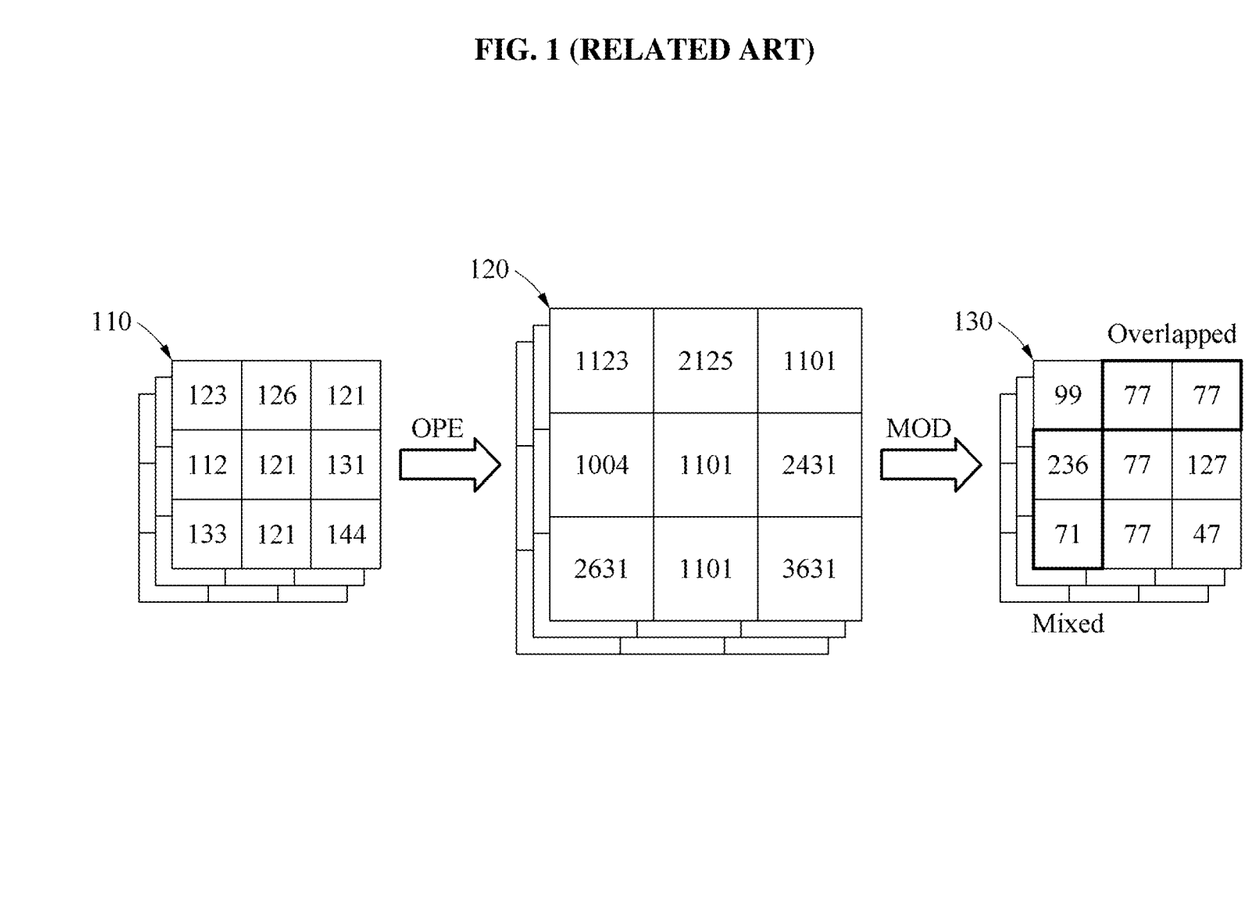
FIG. 1 is a diagram illustrating a data encryption process for deep learning operations according to a related art.

FIG. 1 is a diagram illustrating a data encryption process for deep learning operations according to a related art.

In FIG. 1, there is shown encryption data 120 including values obtained by encrypting numerical values in original data 110 with the order-preserving encryption (OPE) scheme.

In this case, it can be seen that numerical values (e.g., '123', '126', and the like) in the original data 110 are encrypted into values within a random range (e.g., '1123', '2125', and the like) by the OPE scheme.

However, when the original data 110 is image data and the numerical values in the original data 110 are RGB values of each pixel in the image data, the values in the encryption data 120 may need to be within a range of '0 to 255' which is a range of RGB values. Therefore, as shown in FIG. 1, a modular operation (e.g., 'MOD 255') may be performed on the values in the encryption data 120.

In this case, a phenomenon in which the values overlap each other or the orders of the values are mixed may occur in the encryption data 130 on which the MOD operations are performed, and therefore, it is not appropriate to de-identify image data in such a way as to directly apply the OPE scheme to the RGB values of each pixel in the image data.

Accordingly, there is a demand for a technique for de-identifying the image data so as to safely process deep learning on the image data through an external cloud server.

SUMMARY

An aspect provide an image processing method and system capable of securing reliability by preventing the exposure of an original image by using an image that has been de-identified by applying the OPE scheme in the case of processing the deep learning operations of image data by an external cloud server.

Another aspect also provides an image de-identification technique for deep learning such that an image which is converted into a vector image and is then de-identified is maintained in a format that is able to be directly input into an existing deep learning model so as to apply the OPE scheme to the image date.

Another aspect also provides an image processing method and system capable of reducing a learning time by processing deep learning operations in an encrypted state by using a de-identified image, and making it impossible to infer an original image even when the de-identified image is exposed in an learning environment by a cloud server.

According to an aspect, an image processing method includes converting image data including at least one figure image into a vector image by changing a data format, encrypting at least one first attribute value for a position of the figure image in the vector image according to a selected encryption scheme, constructing a de-identified image for the image data by using a second attribute value which is changed by the encryption, and transferring the de-identified image to a cloud server in which a deep learning model is managed and processing deep learning operations of the de-identified image by the cloud server.

According to another aspect, an image processing system includes a conversion unit that converts image data including at least one figure image into a vector image by changing a data format, an encryption unit that encrypts at least one first attribute value for a position of the figure image in the vector image according to a selected encryption scheme, a construction unit that constructs a de-identified image for the image data by using a second attribute value which is changed by the encryption, and a processing unit that transfers the de-identified image to a cloud server in which a deep learning model is managed and process deep learning operations of the de-identified image by the cloud server.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. However, various modifications may be made to the example embodiments so that the scope of the application is not limited or restricted by these example embodiments. It is to be understood that all changes, equivalents, and substitutes for the example embodiments are included in the scope of rights.

The terminology used herein is for the purpose of description and should not be construed as limiting. As used herein, singular forms may include plural forms as well unless the context clearly indicates otherwise. It will be further understood that the terms "comprises," "comprising," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein, including technical or scientific terms, have the same meanings as those generally understood by those skilled in the art to which the example embodiments pertain. Such terms as those defined in a generally used dictionary are to be interpreted as having meanings equal to the contextual meanings in the relevant field of art, and are not to be interpreted as having ideal or excessively formal meanings unless clearly defined as having such in the present application.

In addition, in the description with reference to the accompanying drawings, the same components regardless of reference numerals will be given the same reference numerals and redundant description thereof will be omitted. In addition, in describing example embodiments, when it is determined that the detailed description of the known technology related to the example embodiments may unnecessarily obscure the gist of the example embodiments, the detailed description thereof will be omitted.

Figure 2:
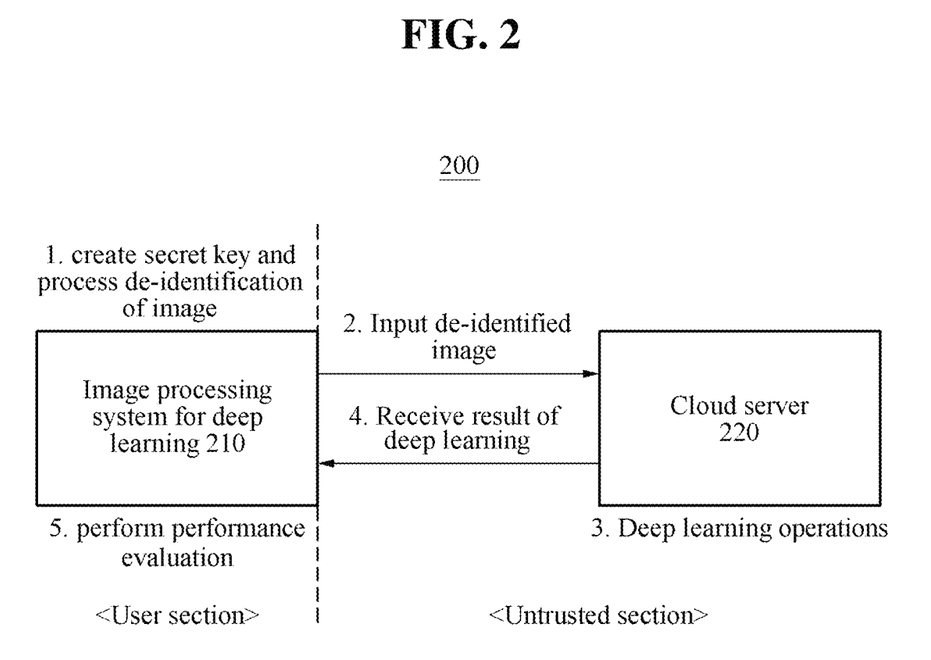
FIG. 2 is a diagram illustrating a network including an image processing system for deep learning according to an example embodiment.

FIG. 2 is a diagram illustrating a network including an image processing system for deep learning according to an example embodiment.

Referring to FIG. 2, a network 200 may include an image processing system 210 for deep learning and a cloud server 220.

The image processing system 210 for deep learning may be located within a user area and may serve to de-identify image data which is an original image.

The cloud server 220 may be located in an untrusted section spaced apart from the user section, and serves to train the deep learning model with the de-identified image.

In detail, when the image data including the at least one figure image is input, the image processing system 210 for deep learning may convert the image data into a vector image including an attribute value for a position of the figure image.

Here, the attribute value may be a numerical value representing a vector position of at least one of a width, a height, a start position for the figure image and a position of a point forming the figure image.

The image processing system 210 for deep learning may construct a de-identified image that reduces the ability identification by a human while maintaining the identification ability of the machine with respect to the image data by encrypting the attribute value according to the OPE scheme using a randomly-generated encryption key.

The image processing system 210 for deep learning may transfer the de-identified image to the cloud server 220 instead of the image data to use the de-identified image to train a deep learning model in the cloud server 220, thus preventing inference of the image data that is the original image, even when the de-identified image is revealed in the untrusted entity.

In this case, when transferring the de-identified image to the cloud server 220, the image processing system 210 for deep learning may change the de-identified image to have the same data format and size of the image data that is the original image, and then input the de-identified image into the deep learning model.

Accordingly, the image processing system 210 for deep learning may not need to modify the deep learning model previously used for learning of the image data to allow the image processing system 210 to process the deep learning operation of the de-identified image within a processing time period similar to that in the case of processing a deep learning operation with the image data.

In the present specification, an 'image classification model' for classifying a figure image in the image data may be provided as an example of the deep learning model.

When receiving a result of processing the deep learning operation from the cloud server 220, the image processing system 210 for deep learning may perform performance evaluation on the deep learning model by using a test image.

As one example of the performance evaluation, the image processing system 210 for deep learning may perform comparison to determine whether a predicted value ('bird'), which is output from the deep learning model when a test image is input to the deep learning model, is identical to a correct answer ('bird') in labeled in the test image.

The image processing system 210 for deep learning may determine that the deep learning model is valid when a correct answer rate is greater than or equal to a reference value, and exclude the de-identified image, with which the deep learning model is trained, from the deep learning model when the correct answer rate is less than the reference value.

As described above, the image processing system 210 for deep learning may modify the deep learning model in consideration of a result of the performance evaluation for the deep learning model that is trained with the de-identified image, thereby achieving accuracy similar to that of the deep learning model constructed by directly learning the original image.

Accordingly, according to the example embodiment, it is possible to secure the reliability of the original image in a learning environment using the cloud server by the image de-identification processing for deep learning, and process deep learning operations at high speed in a state where the de-identified image is maintained as being encrypted by being inputted as it is without modifying an existing deep learning model.

In the present specification, image data may refer to an original image used to train the deep learning model through the cloud server.

Furthermore, in the present specification, a de-identified image may refer to an image on which de-identification has been performed to permit a human not to identify an image data.

The image processing system for deep learning of the present disclosure may propose a technique for de-identifying image data for preserving privacy in an image data learning environment by an external cloud server.

Figure 3:
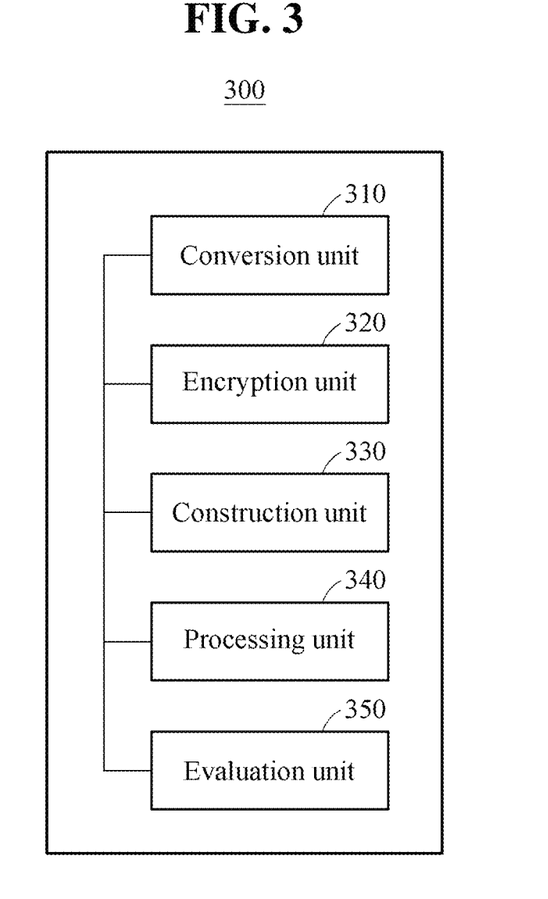
FIG. 3 is a block diagram illustrating an internal configuration of an image processing system for deep learning according to an example embodiment.

FIG. 3 is a block diagram illustrating an internal configuration of an image processing system for deep learning according to an example embodiment.

Referring to FIG. 3, an image processing system 300 for deep learning according to an example embodiment may include a conversion unit 310, an encryption unit 320, a construction unit 330, and a processing unit 340. In addition, according to an example embodiment, the image processing system 300 for deep learning may further include an evaluation unit 350.

The conversion unit 310 may convert image data including at least one figure image into a vector image by changing a data format of the image data.

In other words, the conversion unit 310 may convert the image data to which the OPE scheme to be described later is not able to be applied directly because the image data does not consist of numerical values, into a data format ('Scalable Vector Graphics (SVG) format') to which the OPE scheme is able to be applied.

In general, it may be difficult to protect privacy when being revealed in the process of being transferred to a cloud server for learning because image data may be in a raster format that may be identified by the human.

Accordingly, the conversion unit 310 may perform vectorization for converting the image data which is input in a raster format into a vector image such as an SVG format to de-identify image data 510 for deep learning.

The conversion unit 310 may convert the image data input in at least one raster format of JPG, PNG, TIFF, GIF, and BMP into a vector image with an SVG format.

In detail, the conversion unit 310 may convert the figure image into one vector image, including a first attribute value for a position of at least one of a width, a height, a start position for the figure image in the image data and a position of a point forming the figure image.

Hereinafter, the conversion unit 310 will be described with reference to FIG. 5A.

Figure 5A:
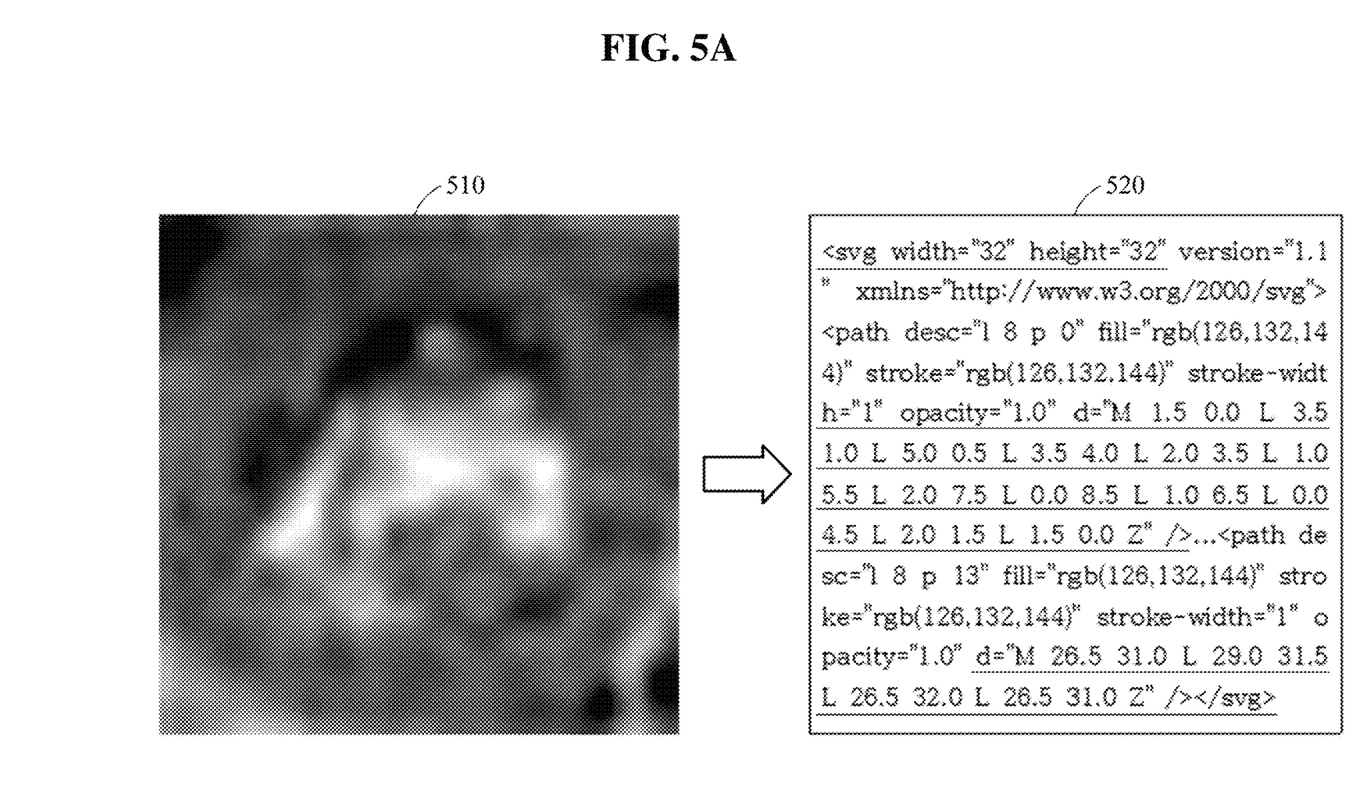
FIG. 5A illustrates an example of converting image data into a vector image in an image processing system for deep learning according to an example embodiment.

FIG. 5A illustrates an example of converting image data into a vector image in an image processing system for deep learning according to an example embodiment.

Referring to FIG. 5A, the conversion unit 310 may convert the image data 510 with the raster format into a vector image 520 with the SVG format by changing the data format. In this case, the conversion unit 310 may change the data format while maintaining the characteristics of the image data 510 that is the original image as much as possible.

The conversion unit 310 may convert the image data 510 into the vector image 520 including a width attribute value ("32") and a height attribute value ("32") of a figure image identified from the image data 510.

In addition, the conversion unit 310 may convert the image data 510 into the vector image 520 to further include attribute values for a start position of the figure image and a position of a point forming the figure image in the <path>.

By vectorization of the image data 510, the vector image 520 may include a first attribute value that is a numerical value, thus making it possible to apply encryption by the OPE scheme.

The encryption unit 320 may encrypt at least one first attribute value for the position of the figure image in the vector image according to a selected encryption scheme.

In the present specification, the OPE scheme may be selected as the encryption scheme. The OPE scheme is an algorithm that encrypts data by only changing the distribution of data, and has the advantage of deep learning data encrypted by the OPE scheme in a cloud server which is an untrusted entity.

For example, when the OPE scheme is selected as the encryption scheme, the encryption unit 320 may determine a range for a second attribute value and set a secret key considering the range.

In addition, the encryption unit 320 may encrypt the first attribute value to create the second attribute value within the range according to the OPE scheme using the secret key.

The encryption unit 320 may randomly set a secret key to be used according to the range of the second attribute value. For example, when the encryption unit 320 determines a range of '300 to 399' as the range of the second attribute value, the encryption unit 320 may set a secret key, for example, 'GJIEHBD' for encrypting the first attribute value belonging to a range of '0 to 99' such that first attribute value does not overlap a value within the range and an order thereof is not mixed with an order of a value within the range.

In addition, the encryption unit 320 may periodically re-determine the range of the second attribute value so as not to infer the first attribute value from the second attribute value by a third party who has acquired the de-identified image, and randomly reset the secret key accordingly, thus blocking possibility of inferring the original image.

Hereinafter, the encryption unit 320 will be described with reference to FIG. 5B.

Figure 5B:
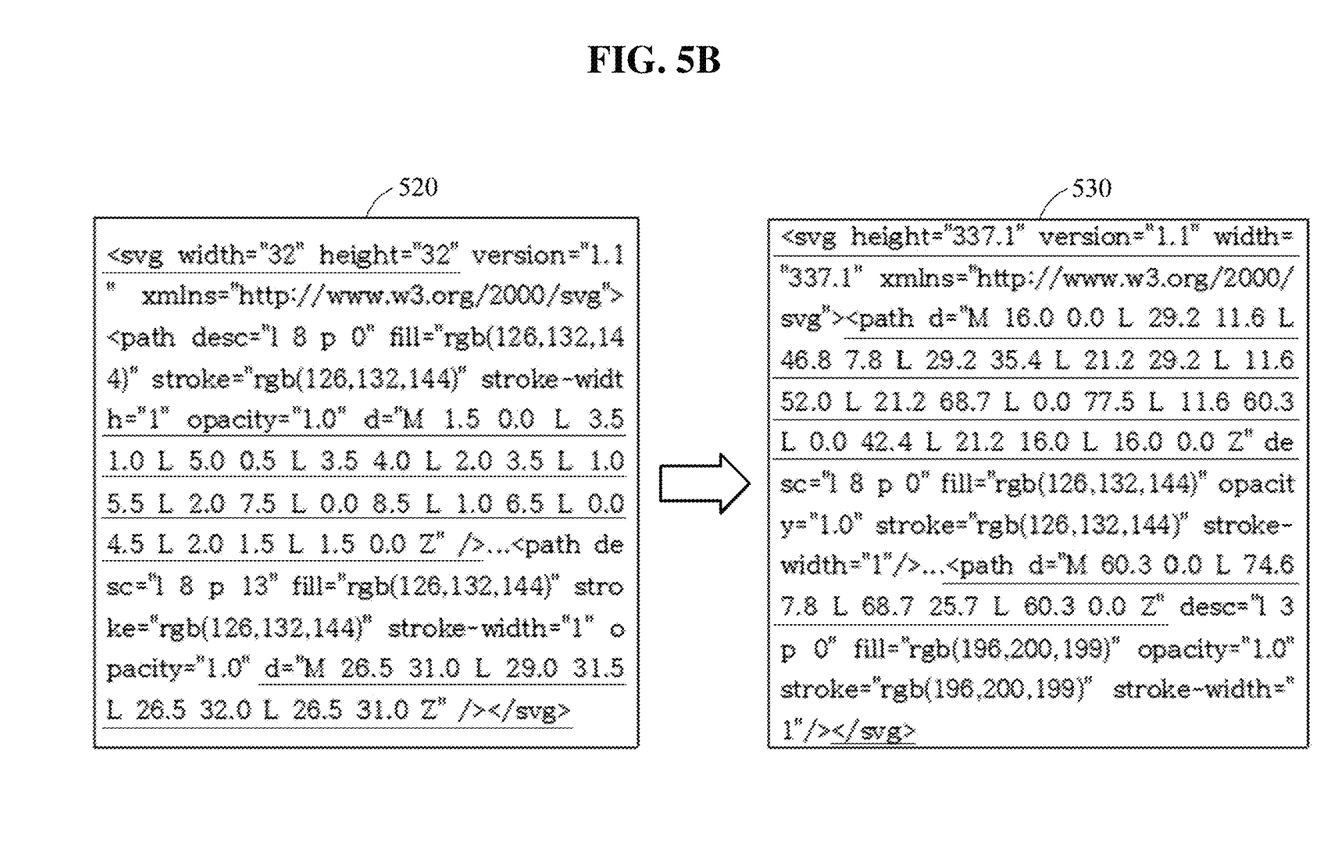
FIG. 5B illustrates an example of applying OPE encryption to a vector image in an image processing system for deep learning according to an example embodiment.

FIG. 5B illustrates an example of applying OPE encryption to a vector image in an image processing system for deep learning according to an example embodiment.

Referring to FIG. 5B, the encryption unit 320 may set a secret key, determine a range of an encrypted second attribute value, and then apply an OPE encryption algorithm to a first attribute value for a position in the vector image 520.

That is, the encryption unit 320 may apply the OPE encryption to the width and the height in the vector image 520 and apply the OPE encryption to numerical data in value "d" constituting a figure inside the tag <path>.

Specifically, the encryption unit 320 may encrypt a width attribute value ("32") and a height attribute value ("32") in the vector image 520 using the secret key 'GJIEHBD', respectively, by using the OPE scheme, and may encrypt a first attribute value ("M 1.5 0.0 L 3.5 1.0 . . . ") for a start position of the figure image and a position of a point forming the figure image in the vector image 520 by using the OPE scheme.

Accordingly, a vector image 530 to which the OPE encryption is applied may include a width attribute value ("337.1") and a height attribute value ("337.1") which have been increased by the OPE encryption, and a second attribute value ("M 16.0 0.0 L 29.2 11.6 . . . ").

As described above, the vector image 530 may be increased from 32 px in each of the width and the height to 337.1 px in each of the width and the height, and values in each tag <path> may be increased. Through this process, the identification ability by the human may be deteriorated while the identification ability by the machine is maintained.

The construction unit 330 may construct a de-identified image for the image data by using a second attribute value which is changed by the encryption.

For example, the construction unit 330 may construct a de-identified image in which a size of a figure image is increased or decreased, including a second attribute value which is changed by encryption of the first attribute value for the width or the height among the positions.

As another example, the construction unit 330 may construct a de-identified image in which a spacing between figure images is increased or decreased, including a second attribute value which is changed by encryption of the first attribute value for a start position or a position of a point forming the figure image among the positions.

Hereinafter, referring to Table 1, an example of applying the Position OPE based on a simple SVG file including one figure image will be described.

TABLE 1

|  | Vector image | OPE encryption-applied vector image |
|---|---|---|
| Script | <svg height="210" width="400"><br><path fill="rgb(0,0,0)" d="M150 0 L75 150 L225 200 Z" /><br></svg> | <svg height="1010" width="2104"><br><path fill="rgb(0,0,0)" d="M822 10 L244 822 L1128 990 Z" /><br></svg> |

TABLE 1-continued

|  | Vector image | OPE encryption-applied vector image |
|---|---|---|
| Graphic expression | ▲ | ▲ |

In Table 1, fill="rgb (0,0,0)" represents filling with a relevant color code, M150 0 represents starting of a path at absolute positions x150, y0, L75 150 represents plotting of a line up to x75, y150, L225 200 represents plotting of a line up to absolute positions x225, y200, and Z represents connecting to the start position of the path and closing of the path.

Referring to Table 1, the encryption unit 320 may apply the OPE encryption to first attribute values (numerical values) representing the position of the figure image, and the construction unit 330 may construct a de-identified image by merely changing the start position and size of a figure without changing the color.

According to an example embodiment, when the encryption unit 320 applies the position OPE to a complex SVG file including several figure images, the construction unit 330 may construct a de-identified image by randomly changing a spacing between the figure images only while maintaining the shape of each of the figure images.

In this case, the construction unit 330 may construct another type of de-identified image according to a secret key used for the encryption.

For example, when the encryption key is set to 'A#@D!A$VAFD', the encryption unit 320 may apply the OPE encryption to a value of d="M150 0 L75 150 L225 200 Z" to be changed into d="M822 10 L244 822 L1128 990 Z".

When the encryption key is set to 'GJIEHBD', the encryption unit 320 may change a value of d="M150 0 L75 150 L225 200 Z" to a value of d="M932 25 L336 932 L1414 1028 Z".

As described above, the construction unit 330 may construct the de-identified image differently according to the secret key used in the OPE encryption, and different secret keys may be used for applications, thus ensuring reliability because the original image is not able to be inferred.

The application may be a tool used to de-identify an original image by performing the OPE encryption on the original image using a unique secret key, which may be distributed in advance to a user end holding the image data.

According to an example embodiment, the construction unit 330 may adjust the de-identified image to have the same size as the image data while changing the de-identified image to have the same data format as the image data through the conversion unit 310.

As an example, the construction unit 330 may change the image having a size which is increased in the process of de-identifying the image data into a raster format of the original image while reducing the size of the image to the size of the original image.

Hereinafter, the conversion unit 310 and the construction unit 330 will be described with reference to FIG. 5C.

Figure 5C:
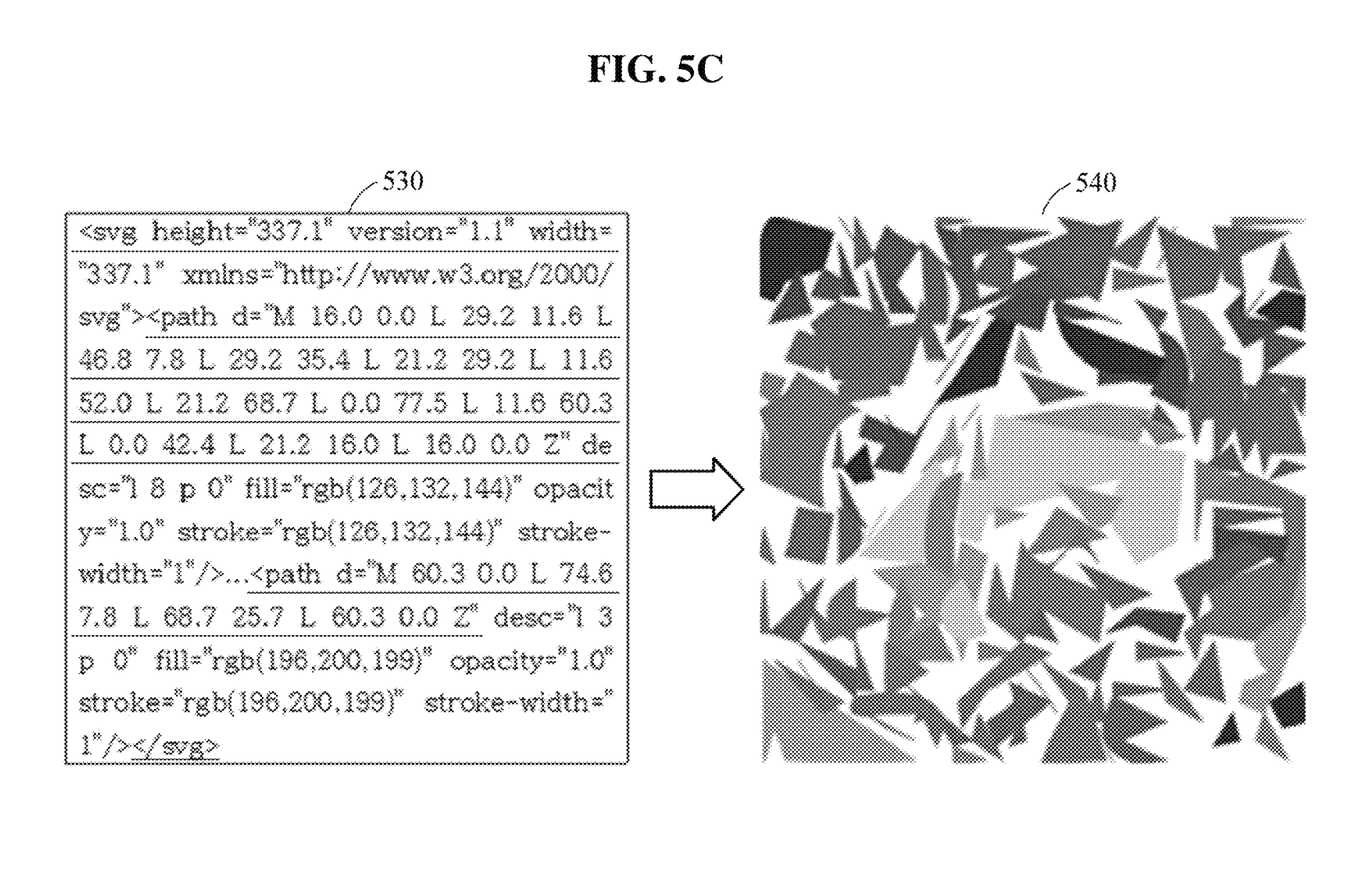
FIG. 5C is a diagram illustrating an example of configuring an de-identified image in an image processing system for deep learning according to an example embodiment.

FIG. 5C is a diagram illustrating an example of configuring an de-identified image in an image processing system for deep learning according to an example embodiment.

Referring to FIG. 5C, the construction unit 330 may convert the vector image 530 to which the OPE encryption is applied, into a raster image again through the conversion unit 310 to use the vector image 530 as input data of an existing deep learning model.

In this case, the conversion unit 310 may convert the vector image 530, which has been enlarged by OPE encryption, into a raster image while reducing the size of the vector image 530 to the size of the original image.

A final de-identified image 540 constructed as described above may have the same data format and size as the original image, and thus may be input to the existing deep learning model as it is without change.

As described above, according to an example embodiment, it is possible to maintain a format that may be directly input into an input layer of the existing deep learning model by processing de-identification by applying the OPE scheme to the image data and quickly process deep learning operations in an state of being encrypted using an de-identified image without changing the existing deep learning model.

The processing unit 340 may transfer the de-identified image to a cloud server in which the deep learning model is managed and process deep learning operations of the de-identified image by the cloud server.

The image classification model is a deep learning model that recognizes and classifies figure images ('bird', 'dog', and the like) in the image data, and may be implemented by, for example, a CNN model.

That is, the processing unit 340 may transfer the de-identified image constructed using an unique secret key set for each application with respect to the image data to the cloud server, and input the image data into an image classification model which is one of the deep learning models to allow the cloud server to process deep learning operations using the de-identified image.

As described above, according to the inventive concept, it is possible to secure the reliability by using the de-identified image in deep learning processing, instead of the original image, even when the de-identified image is exposed to a third party during the learning process by the cloud server and maintain a processing time and performance similar to those in the case of being trained with the original image.

According to an example embodiment, the image processing system 300 for deep learning may further include the evaluation unit 350.

When the evaluation unit 350 receives a processing result ('processing completion') for the deep learning operations using the de-identified image from the cloud server, the evaluation unit 350 may perform performance evaluation on the deep learning models which are trained with the de-identified image using the test image.

For example, the processing unit 340 may process deep learning operations of the de-identified image by a cloud server using 'Resnet50' that is one of the CNN models, which is evaluated as being excellent among the image classification models. The evaluation unit 350 may perform performance evaluation by comparing a predicted value output from the 'Resnet50' with a correct answer labeled in the test image when the test image is input to the 'Resnet50' that has been trained with the de-identified image.

Hereinafter, the evaluation unit 350 will be described with reference to FIG. 6.

Figure 6:
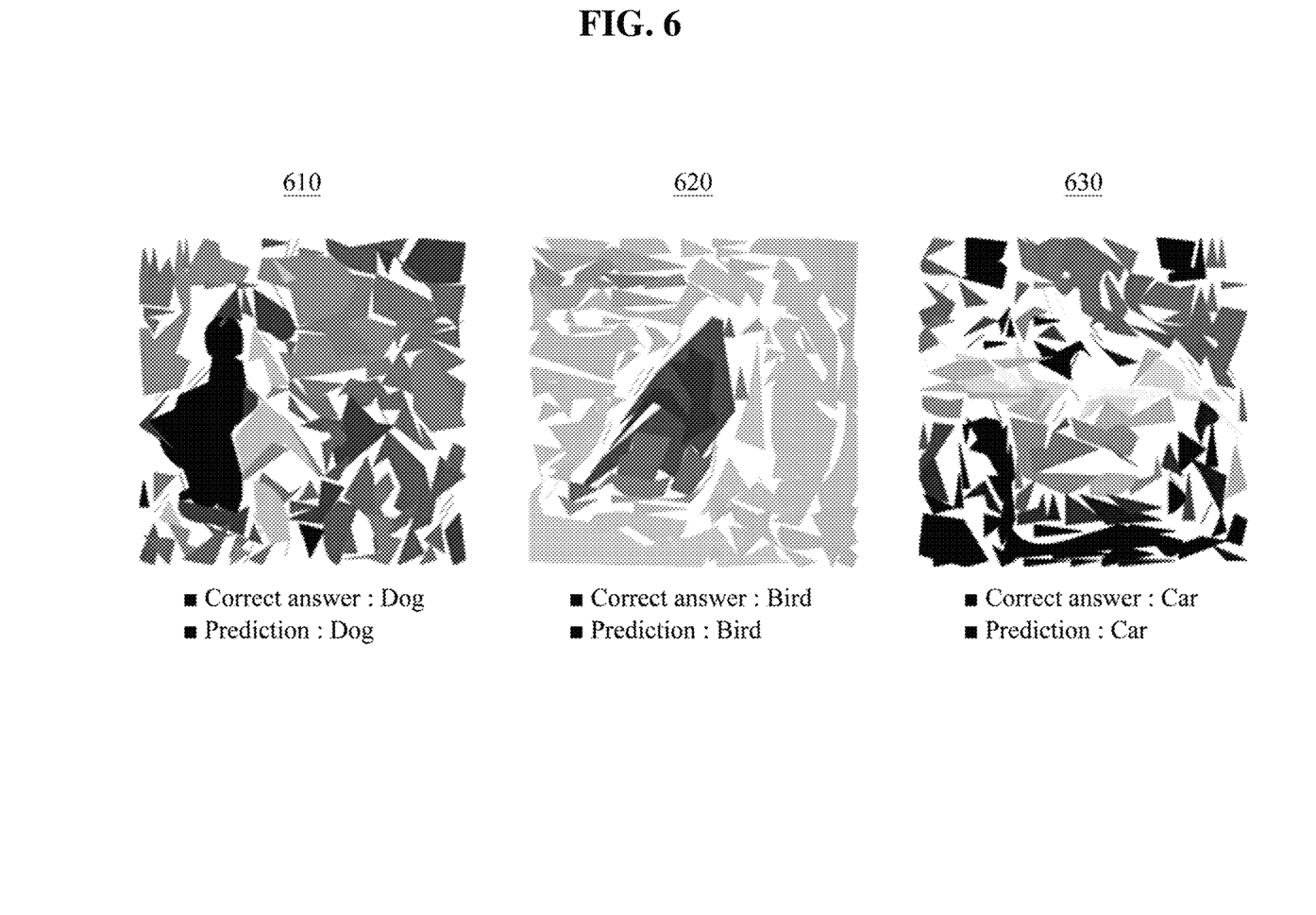
FIG. 6 is a diagram illustrating an example of performing performance evaluation in an image processing system for deep learning according to an example embodiment.

FIG. 6 is a diagram illustrating an example of performing performance evaluation in an image processing system for deep learning according to an example embodiment.

Referring to FIG. 6, the evaluation unit 350 may input test images 610 to 630 into an image classification model 'Resnet50' and perform comparison whether predicted values ('dog', 'bird', and 'car') output from the image classification model match correct answers for the test images 610-630, respectively.

The evaluation unit 350 may determine whether a correct answer rate is greater than or equal to a reference value as a result of performance evaluation for image classification model, when the correct answer rate is greater than or equal to the reference value, determine that the deep learning model is valid, and exclude the de-identified image, with which the deep learning model is trained, from the deep learning model when the correct answer rate is less than the reference value.

According to the inventive concept as described above, it is possible to achieve accuracy similar to that of the deep learning model constructed by directly learning the original image, by applying the result of the performance evaluation for the deep learning model which is trained with the de-identified image.

In addition, according to an example embodiment, the evaluation unit 350 may determine whether a result of the performance evaluation ('correct answer rate') matches the result of the performance evaluation for a first deep learning model which is trained with the image data that is an original image within a predetermined error range, and when they match each other, determine that the deep learning model is valid.

As mentioned above, according to an example embodiment, by the image de-identification process for deep learning, the identification ability by the person is deteriorated while the identification ability by the machine is maintained, thus securing the reliability of the original image even in a learning environment using a cloud server that is an untrusted entity.

Figure 4:
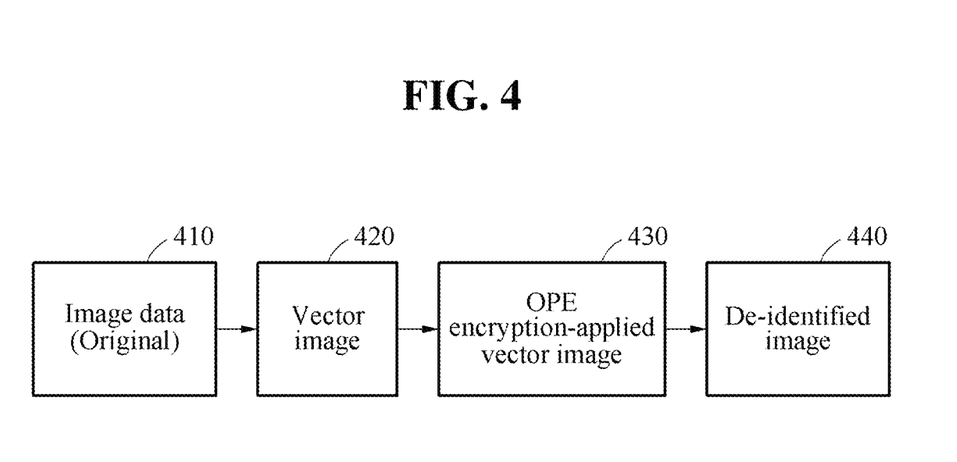
FIG. 4 is a diagram illustrating a de-identification process for image data in an image processing system for deep learning according to an example embodiment.

FIG. 4 is a diagram illustrating a process of de-identifying image data in an image processing system for deep learning according to an example embodiment.

Referring to FIG. 4, an image processing system for deep learning may first perform vectorization for converting image data 410 into a vector image 420.

In other words, the image processing system for deep learning may vectorize the image data 410 so as to make it possible to apply the OPE scheme to the image data 410 which does not consist of numerical values.

Next, the image processing system for deep learning may perform encryption by applying the OPE scheme to a vector position in the vector image 420.

That is, the image processing system for deep learning may identify at least one figure image (e.g., 'dog', 'bird', 'car', triangle', or the like) in the image data 410, and encrypt the vector position which is the numerical value of at least one among the width, the height, and the start position for the figure image and a position of a point forming a figure, by using the OPE scheme.

Accordingly, a vector image 430 to which the OPE encryption is applied may include the vector position which has been changed into another numerical value in a range determined by the encryption.

The image processing system for deep learning may construct a de-identified image 440 by changing the vector image 430 to have the same data format ('raster format') and size as the image data 410 that is an original image.

In this case, the image processing system for deep learning may construct the de-identified image 440 different from the image data 410 by increasing or decreasing the size of the figure image or the interval between the figure images according to the changed vector position.

For example, the de-identified image 440 may have the same shape (e.g., 'triangle') or color ('RGB') as the figure image in the image data 410, but have the size of the width or height of the figure image or a spacing between figure images which is different from that of the figure image in the image data 410.

The final image (de-identified image 440) generated by the above-described de-identification process may not only enable learning without changing an existing deep learning model, but also satisfy impossibility for inference of the original data of the PPDL.

Hereinafter, the workflow of the image processing system 300 for deep learning according to example embodiments will be described in detail.

Figure 7:
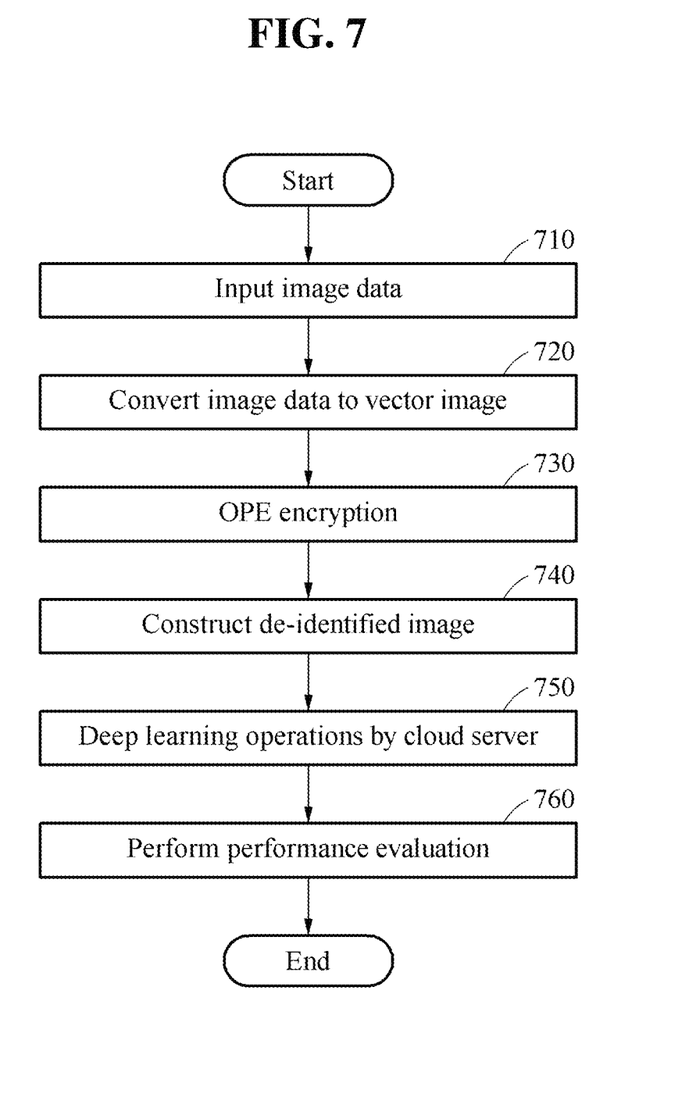
FIG. 7 is a flowchart illustrating a procedure of an image processing method for deep learning according to an example embodiment.

FIG. 7 is a flowchart illustrating a procedure of an image processing method for deep learning according to an example embodiment.

The image processing method for deep learning according to the present example embodiment may be performed by the image processing system 300 described above.

Referring to FIG. 7, in operations 710 and 720, the image processing system 300 may convert an image data, which is input, into a vector image by changing a data format.

For example, when image data including at least one figure image is input, the image processing system 300 may convert the image data into a vector image including an attribute value for a position of a figure image in the image data.

Here, the attribute value may be a numerical value representing at least one position (vector position) among the width, height, start position of the figure image and a position of a point forming a figure.

In operation 730, the image processing system 300 may encrypt at least one first attribute value for the position of the figure image in the vector image according to a selected encryption scheme (OPE encryption algorithm).

In operation 740, the image processing system 300 may construct a de-identified image for the image data using a second attribute value, which has been changed by the encryption.

For example, the image processing system 300 may construct the de-identified image having the same form and shape but having an increased size or spacing between figure images by using the second attribute value increased by the encryption.

In this way, the image processing system 300 may construct a de-identified image for which the identification ability by the human is deteriorated while the identification ability by the machine is maintained.

In this case, the image processing system 300 may construct the de-identified image using the unique secret key set for each application with respect to the image data.

In operation 750, the image processing system 300 may transfer the de-identified image to a cloud server, and allow the cloud server to process a deep learning operation for the de-identified image.

That is, the image processing system 300 may transfer the de-identified image instead of the image data to the cloud server in which the deep learning model is managed, to allow the cloud server to train the deep learning model.

Therefore, according to the inventive concept, it is possible to maintain high reliability by preventing inference of the original image (image data) even when the de-identified image is revealed to a third party during the deep learning process by the cloud server that is the untrusted entity.

Furthermore, when transferring the de-identified image to the cloud server, the image processing system 210 may change the de-identified image to have the same data format and size of the image data, and then input the de-identified image into the deep learning model.

Accordingly, the image processing system 300 may not need to modify the deep learning model previously used for learning of the image data and maintain a processing time period and performance similar to those in the case of processing a deep learning operation with the image data.

In operation 760, when receiving a result of processing a deep learning operation using the de-identified image from the cloud server, the image processing system 300 may perform performance evaluation for the deep learning model that is trained with the de-identified image using a test image.

That is, the image processing system 300 may modify the deep learning model in consideration of a result of the performance evaluation for the deep learning model that is trained with the de-identified image, thereby achieving accuracy similar to that of the deep learning model constructed by directly learning the original image.

As described above, according to an example embodiment, it is possible to secure the reliability by preventing the exposure of an original image by using an image that is de-identified by applying an order preservation encryption (OPE) scheme when processing a deep learning operation of image data by an external cloud server.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the present invention, or they may be of the kind well-known and available to those having skill in the computer software arts. Examples of computer readable recording media include magnetic media such as hard disks, magnetic media such as floppy disks and magnetic tape, optical media such as CD-ROMs, DVDs, Magneto-optical media such as floppy disks, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the present invention, and vice versa.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Although the example embodiments have been described by the limited example embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved.

Therefore, other implementations, other example embodiments, and equivalents to the claims are within the scope of the following claims.

According to example embodiments, it is possible to secure reliability of an original image even in the learning environment using the cloud server which is an untrusted section by deteriorating the identification ability by the human while maintaining the identification ability by the machine and through the image de-identification process for deep learning.

According to example embodiments, it is possible to maintain a format that may be directly input into an input layer of the existing deep learning model by applying the OPE encryption scheme to the image data to process de-identification.

According to example embodiments, it is possible to quickly process deep learning operations in a state of being encrypted using a de-identified image without changing the existing deep learning model.

According to example embodiments, it is possible to maintain a processing time and performance similar to those trained with the original image even when the de-identified image is used for the deep learning process instead of the original image, While the present disclosure has been described with reference to example embodiments, it will be apparent to those skilled in the art that various changes and modifications may be made without departing from the spirit and scope of the present disclosure. Therefore, it should be understood that the above example embodiments are not limiting, but illustrative.

What is claimed is:

1. An image processing method comprising:
    converting image data including at least one figure image into a vector image by changing a data format;
    encrypting at least one first attribute value for a position of the figure image in the vector image according to an Order-Preserving Encryption (OPE) scheme:
    constructing a de-identified image for the image data by using a second attribute value which is changed by the encryption; and
    transferring the de-identified image to a cloud server in which a deep learning model is managed and processing deep learning operations of the de-identified image by the cloud server.

2. The image processing method of claim 1, wherein the converting of the image data into the vector image includes converting the figure image into one vector image including the first attribute value for a position of at least one of a width, a height, a start position for the figure image in the image data and a position of a point forming the figure image.

3. The image processing method of claim 1, wherein the converting of the image data into the vector image includes converting the image data input in at least one raster format of JPG, PNG, TIFF and BMP into the vector image with a SVG format.

4. The image processing method of claim 1, wherein the encrypting of the first attribute value includes:
    determining a range for the second attribute value;
    setting a secret key in consideration of the range; and
    encrypting the first attribute value to create the second attribute value in the range according to the Order-Preserving Encryption (OPE) scheme by using the secret key.

5. The image processing method of claim 1, wherein the constructing of the de-identified image includes:
    constructing a de-identified image in which a size of the figure image is increased or decreased, including a second attribute value which is changed by encryption of a first attribute value for a width or a height of the figure image among the positions; or
    constructing a de-identified image in which a spacing between figure images is increased or decreased, including a second attribute value which is changed by encryption of a first attribute value for a start position of the figure image or a position of a point forming the figure image among the positions.

6. The image processing method of claim 1, further comprising:
    changing the de-identified image into a same data format as the image data; and
    adjusting a size of the de-identified image to the same size as the image data in changing the data format.

7. The image processing method of claim 1, further comprising:
    transferring an de-identified image constructed using an unique secret key set for each application to the cloud server with respect to the image data to input the de-identified images to an image classification model that is one of the deep learning models; and
    processing deep learning operations using the de-identified image by the cloud server.

8. The image processing method of claim 1, further comprising:
    receiving a processing result for the deep learning operations using the de-identified image from the cloud server;
    performing performance evaluation for the deep learning model which is trained with the de-identified image using the test image; and
    determining that the deep learning model is valid when a result of the performance evaluation matches a result of performance evaluation for a first deep learning model which is trained with the image data that is an original image in a predetermined error range.

9. An image processing system comprising:
    a conversion unit configured to convert image data including at least one figure image into a vector image by changing a data format;
    an encryption unit configured to encrypt at least one first attribute value for a position of the figure image in the vector image according to an Order-Preserving Encryption (OPE) scheme;
    a construction unit configured to construct a de-identified image for the image data by using a second attribute value which is changed by the encryption; and
    a processing unit configured to transfer the de-identified image to a cloud server in which a deep learning model is managed and process deep learning operations of the de-identified image by the cloud server,
    wherein all the units are implemented by hardware or a circuit.

10. The image processing system of claim 9, wherein the conversion unit is configured to convert the figure image into one vector image, including a first attribute value for a position of at least one of a width, a height, a start position of the figure image in the image data and a position of a point forming the figure image.

11. The image processing system of claim 9, wherein the encryption unit is configured to:
determine a range for the second attribute value and set a secret key in consideration of the range, and
encrypt the first attribute value to create the second attribute value in the range according to the Order-Preserving Encryption (OPE) scheme by using the secret key.

12. The image processing system of claim 9, wherein the construction unit is configured to:
construct a de-identified image in which a size of the figure image is increased or decreased, including a second attribute value which is changed by encryption of a first attribute value for a width or a height of the figure image among the positions; or
construct a de-identified image in which a spacing between figure images is increased or decreased, including a second attribute value which is changed by encryption of a first attribute value for a start position of the figure image or a position of a point forming the figure image among the positions.

13. The image processing system of claim 9, wherein the construction unit is configured to:
change the de-identified image into a same data format as the image data; and
adjust a size of the de-identified image to the same size as the image data in changing the data format through the conversion unit.

14. The image processing system of claim 9, wherein the processing unit is configured to:
transfer an de-identified image constructed using an unique secret key set for each application to the cloud server with respect to the image data to input the de-identified images to an image classification model that is one of the deep learning models; and
process deep learning operations using the de-identified image by the cloud server.

15. The image processing system of claim 9, further comprising:
an evaluation unit configured to receive a processing result for the deep learning operations using the de-identified image from the cloud server, perform performance evaluation for the deep learning model which is trained with the de-identified image using the test image, and determine that the deep learning model is valid when a result of the performance evaluation matches a result of performance evaluation for a first deep learning model which is trained with the image data that is an original image in a predetermined error range.

* * * * *